UNITED STATES PATENT OFFICE.

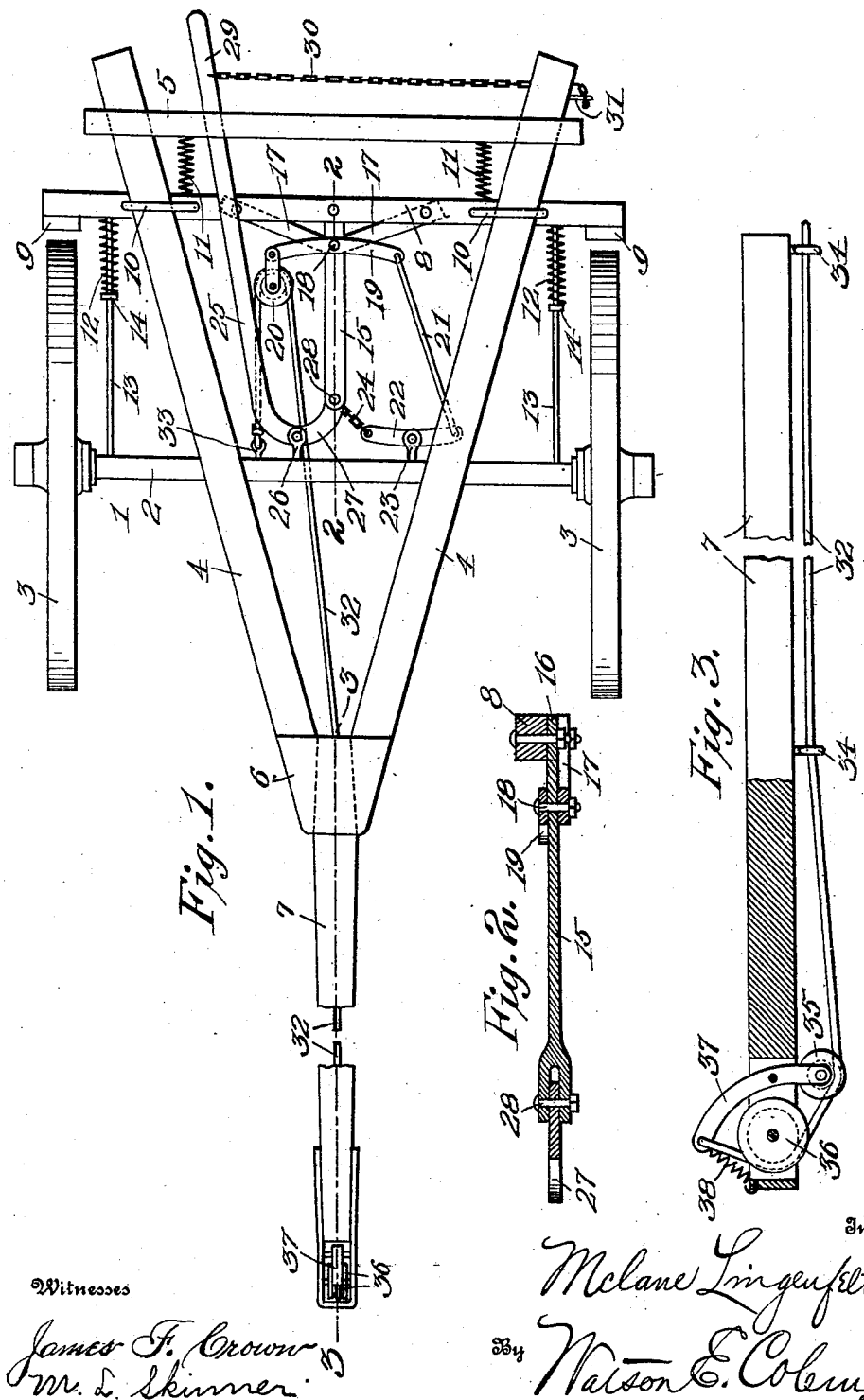

McLANE LINGENFELTER, OF McKEE GAP, PENNSYLVANIA.

BRAKE.

No. 910,553.  Specification of Letters Patent.  Patented Jan. 26, 1909.

Application filed April 6, 1908. Serial No. 425,512.

*To all whom it may concern:*

Be it known that I, McLANE LINGENFELTER, a citizen of the United States, residing at McKee Gap, in the county of Blair and State of Pennsylvania, have invented certain new and useful Improvements in Brakes, of which the following is a specification, reference being had to the accompanying drawings.

My invention relates to improvements in brakes for farm wagons and other vehicles, and it consists of the novel features of construction and the combination and arrangement of parts hereinafter fully described and claimed.

The object of the invention is to provide a simple, practical and effective vehicle brake mechanism which may be operated either manually or automatically by the animal or animals attached to the vehicle.

The above and other objects of the invention are attained in its preferred embodiment illustrated in the accompanying drawings, in which—

Figure 1 is a plan view of the front portion of the running gear of a wagon or the like, showing my improved brake mechanism applied thereto; and Figs. 2 and 3 are detail sections taken, respectively, on the planes indicated by the lines 2—2 and 3—3 in Fig. 1.

In the drawings 1 denotes the front truck or carriage of a wagon or similar vehicle, the same comprising an axle 2 having journaled upon its ends wheels 3 and connected to its intermediate portion hounds 4 united at their diverging rear ends by a cross bar 5 and at their converging front ends by a socket member 6 which receives the draft tongue or pole 7.

8 denotes a transverse brake beam arranged for forward and rearward sliding movement upon the rear portions of the hounds 4 and having at its ends brake shoes 9 to engage the rims of the wheels Z. The brake beam is loosely suspended for sliding movement, preferably, by means of U-shaped bolts, or clips 10 arranged upon its top so as to loosely receive the hounds 4. Said brake beam is actuated in a rearward direction to hold its shoes 9 normally away from the wheels 3 by coil springs 11 arranged between the cross bar 5 and the brake beam and by coil springs 12 arranged upon guide rods 13 disposed longitudinally and having their front ends suitably connected to the axle 2 and their rear ends projecting through and slidable in apertures or openings in the brake beam 8. The coil springs 12 are confined between the brake beam and stop shoulders formed upon the guide rods 13 by adjustable collars 14.

Projecting forwardly from the center of the brake beam 8 is an arm or bar 15, the forward free end of which is bifurcated and the rear end of which is bolted to the brake beam as at 16 and further fixed and strengthened by an angular brace 17, which latter further serves to reinforce a vertical pivot 18 for a lever 19. This lever is disposed transversely and may be curved longitudinally or angular in shape and upon one of its ends or arms, which latter are preferably of equal length, is a pulley block 20. The other arm or end of the lever 19 is connected by a link or rod 21 to one arm of a second lever 22 pivoted intermediate its ends by an eye bolt or equivalent means 23 to the axle 2. The other arm of the lever 22 is connected by a short chain 24 to the forward end of the arm or bar 5. An operating hand lever 25 of substantially right angular shape is pivoted at its angle by an eye bolt or the like 26 to the axle 2. Said lever 25 has a short arm 27 pivoted in the bifurcated forward end of the arm 15 by a bolt or the like 28 which also serves to attach the chain 24 to said arm 15. The other arm 29 of the lever or bell crank 25 extends outwardly and rearwardly and is comparatively long so that its rear end projects beyond the cross bar 5 and serves as a means for manually operating the brake. It will be seen that when the rear or handle end 29 of the lever 25 is swung inwardly its short end 27 will draw the arm 15, and hence the brake beam 8, in a forward direction to cause the shoes 9 on the latter to frictionally engage the wheels 3.

For the purpose of holding the brake applied and for permitting it to be conveniently operated from the side of the vehicle opposite that toward which the lever 25 projects, I provide a chain 30 which extends transversely in rear of the cross bar 5 and has one of its ends attached to the arm 29 of the lever 25. The free end of the chain is hung upon the keeper pin 31 arranged upon the rear end of one of the hounds 4 so that the chain is always supported within convenient reach and the brake can be operated from the left hand side of the vehicle by grasping and drawing upon said chain. By hooking the chain over the pin 31 after the brake beam has been moved forwardly to an operative position, it will be seen that the brake can be held applied.

In order to permit the brake to be operated automatically by the team hitched to the vehicle when the latter travels down grade or when it is desired to stop the vehicle, I provide a cable, rope, or other flexible element 32, the rear end of which is passed around the pulley in the block 20 and attached to an eye bolt or the like 33 on the axle 2. The forward end of the cable 32 passes through guide eyes 34 arranged at intervals upon the tongue 7 and around two pulleys 35, 36, the latter of which is journaled upon the tongue and the former upon the lower end of a vertically disposed lever 37 pivoted intermediate its ends to the tongue and having the forward end of the cable attached at its upper end. A spring 38 is provided between the tongue and the lever for holding its upper end in a forwardly inclined position and allowing the cable 32 to be slack when there is no backward pull.

From the foregoing it will be seen that my improved brake is exceedingly simple and may therefore be produced at a small cost and readily applied to wagons or vehicles of various kinds. It will also be noted that it is strong and durable in construction and powerful and efficient in operation.

While I have shown and described it as applied to the front truck or carriage of a vehicle it will be understood that it may be as readily applied to the rear truck or carriage and that it may be applied simultaneously to both trucks and the two brake devices may be operated independently or simultaneously.

Various other changes in the form, proportion and minor details of construction may be resorted to without departing from the spirit or sacrificing any of the advantages of the invention.

Having thus described my invention what I claim is:

1. In a vehicle brake, the combination with a running gear comprising an axle, wheels and hounds, of a brake beam slidably mounted on the hounds, the forwardly projecting arm 15 rigidly connected to said beam, the bell crank 25 pivoted at its angle to the axle and having its short end pivoted to said arm, the long end 29 of said bell crank extending outwardly and rearwardly and forming a handle and a spring for retracting the brake beam.

2. In a vehicle brake, the combination with a running gear comprising an axle, wheels and hounds, of a brake beam slidably mounted on the hounds, the forwardly projecting arm 15 rigidly connected to said beam, the bell crank 25 pivoted at its angle to the axle and having its short end pivoted to said arm, the long end 29 of said bell crank extending outwardly and rearwardly and forming a handle, a spring for retracting the brake beam, the keeper pin 31 and the chain 30 attached to the handle 29 of the bell crank and adjustably engaged with said keeper pin.

3. In a vehicle brake, the combination with a running gear comprising an axle, wheels and hounds, of a brake beam slidably mounted on the hounds, an arm projecting from the beam, a spring for retracting the brake beam, a lever pivoted intermediate its ends to the axle and having one end loosely connected to said arm, a lever carried by the brake beam and pivoted intermediate its ends, a link connecting one end of the last mentioned lever to the other end of the first mentioned one, a pulley upon the other end of the second mentioned lever and an operating cable having one end fixed and its other end passed around said pulley.

4. In a vehicle brake, the combination with a running gear comprising an axle, wheels, connected hounds and a tongue, of a brake beam slidable upon the hounds, an arm projecting from said beam, a spring for retracting said beam, a bell crank pivoted at its angle to the axle and having a short end connected to the arm and a long end providing a handle, a lever pivoted intermediate its ends to the axle and having one end loosely connected to said arm, a lever carried by the brake beam and pivoted intermediate its ends, a guide upon one end of the last mentioned lever, a link connecting the other end of the last mentioned lever to the other end of the first mentioned one, guides upon the tongue and an operating cable fixed at one end and passed over the guide upon said lever and the guides upon the tongue.

5. In a vehicle brake, the combination with a running gear comprising an axle, wheels and hounds, of a brake beam slidably mounted on the hounds, the forwardly projecting arm 15 rigidly connected to said beam, the bell crank 25 pivoted at its angle to the axle and having its short end pivoted to said arm, the long end 29 of said bell crank extending outwardly and rearwardly and forming a handle, a spring for retracting the brake beam, means actuated by the animals hitched to the vehicle for operating said arm on the brake beam and means for locking the bell crank to hold the brake applied.

6. In a vehicle brake, the combination with a running gear comprising an axle, wheels and hounds, the latter being connected by a cross bar, of a brake beam arranged beneath the hounds, the clips 10 carried by the brake beam and loosely engaged with the hounds to slidably suspend the brake beam from the latter, guide rods projecting from the axle and extending loosely through openings in the brake beam, stops upon said guide rods, coil springs arranged upon the latter between the stops and the brake beam for retracting said beam, a centrally arranged arm projecting from the brake beam, and a lever pivoted to the axle and connected to said arm for actuating the brake beam.

In testimony whereof I hereunto affix my signature in the presence of two witnesses.

McLANE LINGENFELTER.

Witnesses:
    HENRY DELL,
    WILLIAM BUTLER.